US006959128B2

(12) United States Patent
Castañón et al.

(10) Patent No.: US 6,959,128 B2
(45) Date of Patent: Oct. 25, 2005

(54) COUPLER-BASED OPTICAL CROSS-CONNECT HAVING A REGENERATION MODULE

(75) Inventors: Gerardo Antonio Castañón, Monterrey Nuevo Leon (MX); Rémi R. Pecqueur, Sequedin (FR); Takeshi Hoshida, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 10/726,157

(22) Filed: Dec. 2, 2003

(65) Prior Publication Data

US 2005/0117908 A1    Jun. 2, 2005

(51) Int. Cl.[7] ............................ G02B 6/26; H04B 17/00
(52) U.S. Cl. ............................ 385/16; 385/15; 385/17; 385/24; 385/51; 385/14; 398/37; 398/45; 398/50; 398/56; 398/82
(58) Field of Search ............................ 385/16, 15, 17, 385/18, 24, 31, 39, 40, 42, 14; 398/18, 19, 398/37, 45, 56, 82, 97

(56) References Cited

U.S. PATENT DOCUMENTS

| | | | |
|---|---|---|---|
| 4,989,199 A | 1/1991 | Rzeszewski ................ 370/1 |
| 5,194,977 A | 3/1993 | Nishio ...................... 359/128 |
| 5,446,809 A | 8/1995 | Fritz et al. ................ 385/17 |
| 5,450,224 A | 9/1995 | Johansson ................ 359/128 |
| 5,452,115 A | 9/1995 | Tomioka ................... 359/123 |
| 5,642,447 A | 6/1997 | Pan et al. .................. 385/31 |
| 5,710,846 A * | 1/1998 | Wayman et al. ........... 385/17 |
| 5,724,167 A | 3/1998 | Sabella ..................... 359/128 |
| 5,739,935 A | 4/1998 | Sabella ..................... 359/128 |
| 5,889,600 A | 3/1999 | McGuire ................... 359/128 |

(Continued)

FOREIGN PATENT DOCUMENTS

EP    1 017 242 A1    7/2000    .......... H04Q 11/00

OTHER PUBLICATIONS

Zacks, et al., U.S. Patent Publication No. US2002/0071151 A1, Module and Method for Reconfiguring Optical Networks, Filed Dec. 10, 2001, Published Jun. 13, 2002, 10 pages.

(Continued)

Primary Examiner—Brian M. Healy
(74) Attorney, Agent, or Firm—Baker Botts L.L.P.

(57) ABSTRACT

An optical cross-connect includes multiple input ports that each receive an optical input signal and multiple output ports that each output an optical output signal. The optical cross-connect also includes a distributing amplifier associated with each input port that generates multiple copies of the input signal received at the associated input port. Furthermore, the optical cross-connect includes multiple filter units that receive a copy of one or more of the input signals from one or more of the distributing amplifiers and forward traffic in selected channels of one or more of the received copies. In addition, the optical cross-connect includes a combining amplifier associated with each output port. Each combining amplifier receives the traffic in one or more of the channels forwarded by one or more of the filter units and combines the received traffic into an output signal to be output from the associated output port. The optical cross-connect further includes one or more regeneration modules that each regenerate the traffic in one or more channels of one or more of the input signals.

31 Claims, 6 Drawing Sheets

U.S. PATENT DOCUMENTS

| | | | |
|---|---|---|---|
| 5,959,767 A | 9/1999 | Fatehi et al. | 359/341 |
| 6,160,648 A | 12/2000 | Oberg et al. | 359/110 |
| 6,192,172 B1 | 2/2001 | Fatehi et al. | 385/17 |
| 6,327,059 B1 | 12/2001 | Bhalla et al. | 359/109 |
| 6,490,383 B1 * | 12/2002 | Jourdan et al. | 385/17 |
| 6,496,289 B1 | 12/2002 | Kuroyanagi et al. | 359/128 |
| 6,529,300 B1 * | 3/2003 | Milton et al. | 398/59 |
| 6,532,091 B1 * | 3/2003 | Miyazaki et al. | 398/175 |
| 6,735,392 B1 * | 5/2004 | Elahmadi et al. | 398/7 |

OTHER PUBLICATIONS

Magnus Grenfeldt, "Erion—Ericsson Optical Networking Using WDM Technology", Ericcson Review No. 3, 1998, pp. 132-137.

Allan Ashmead DigiLens, Inc., "RoadMap for Metro Market", Fiberoptic Product News, Oct. 2001, p pages.

Rob Batchellor, "Optical Networking the Ericsson Way", Ericcson Limited, Business Unit Transport and Cable Networks, pp. 1-4, Feb. 22, 2002.

* cited by examiner

COUPLER-BASED OPTICAL CROSS-CONNECT HAVING A REGENERATION MODULE

TECHNICAL FIELD OF THE INVENTION

The present invention relates generally to optical transport systems, and more particularly to a coupler-based optical cross-connect having a regeneration module.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

Optical cross-connects (OXCs) are often used for wavelength path routing in optical networks. In the typical OXC node, array waveguide gratings (AWGs) are used for demultiplexing the WDM/DWDM signal into its constituent wavelengths. Because AWGs have fixed channel spacing and a fixed number of output ports, these devices limit the channel spacing and switching flexibility of an OXC node.

SUMMARY

In accordance with a particular embodiment of the present invention, an optical cross-connect includes multiple input ports that each receive an optical input signal and multiple output ports that each output an optical output signal. The optical cross-connect also includes a distributing amplifier associated with each input port that generates multiple copies of the input signal received at the associated input port. Furthermore, the optical cross-connect includes multiple filter units that receive a copy of one or more of the input signals from one or more of the distributing amplifiers and forward traffic in selected channels of one or more of the received copies. In addition, the optical cross-connect includes a combining amplifier associated with each output port. Each combining amplifier receives the traffic in one or more of the channels forwarded by one or more of the filter units and combines the received traffic into an output signal to be output from the associated output port. The optical cross-connect further includes one or more regeneration modules that each regenerate the traffic in one or more channels of one or more of the input signals.

Technical advantages of one or more embodiments of the present invention may include providing a coupler-based optical cross-connect that does not require the use of multiplexer or demultiplexers. Therefore, such embodiments may provide switching wavelength flexibility since there are no inherent channel number or channel spacing limitations when using optical couplers (unlike optical cross-connects that use multiplexers and demultiplexers). Furthermore, the use of optical couplers or similar passive waveguide components provides for a more reliable and low-cost product.

In addition, the modular architecture of particular embodiments allows for incremental upgrades ("pay as you grow") and in-service upgrades.

Furthermore, certain embodiments provide for selective regeneration of particular input signals or portions thereof. This selective regeneration eliminates or reduces redundant optical-electrical-optical conversions and thus reduces the cost of the optical cross-connect.

It will be understood that the various embodiments of the present invention may include some, all, or none of the enumerated technical advantages. In addition, other technical advantages of the present invention may be readily apparent to one skilled in the art from the figures, description and claims included herein.

DETAILED DESCRIPTION

Figure 1:
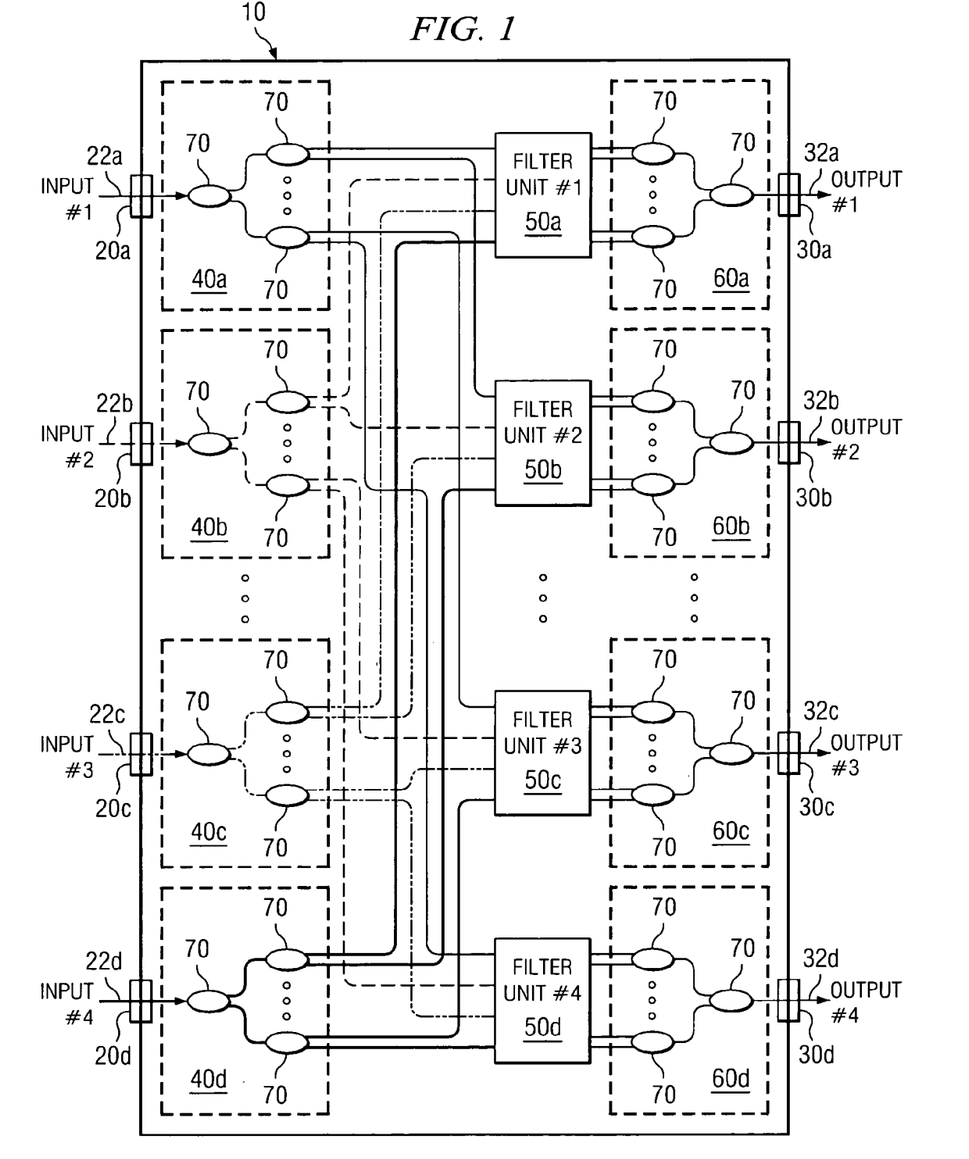
FIG. 1 is a block diagram illustrating an example optical cross-connect.

FIG. 1 is a block diagram illustrating an example optical cross-connect (OXC) 10. OXCs may be implemented in optical networks in which a number of optical channels are carried over a common path in disparate channels (for example, networks implementing wavelength division multiplexing (WDM), dense wavelength division multiplexing (DWDM), coarse wavelength division multiplexing, or any other suitable multiplexing technique). OXCs may be used in a variety of implementations for a variety of different purposes, but their basic function is to switch the information carried in one or more channels of one or more input signals to one or more channels of one or more output signals.

As an example only, OXC 10 includes four input ports 20a–20d that are operable to receive four different input signals 22a–22d. As described below, although four input ports 20 and input signals 22 are illustrated, any suitable number of ports 20 and signals 22 may be implemented and/or used. In certain embodiments, each input signal 22 may compromise a signal received over an optical fiber that is coupled to the corresponding input port 20. Each input signal 22 may comprise a number of channels that are each able to carry separate information ("traffic"). The traffic in each channel of a particular input signal 22 may be forwarded or "switched" by OXC 10 to any of a number of output ports 30a–30d and be communicated as a part of an associated output signal 32a–32d. As an example only, the traffic in a channel of input signal 22a may be forwarded from OXC 10 as a channel of output signal 32*c*. As with input ports 20, although only four output ports 30 are illustrated, any suitable number of output ports 30 and associated output signals 32 may be implemented and/or used in OXC 10.

OXC 10 is able to forward a particular channel of one input signal 22 to a particular output port 30 using a series of distributing amplifiers 40, wavelength filter units 50 (which also may be referred to as wavelength select units or wavelength blockers), and combining amplifiers 60. As illustrated in FIG. 1, there may be a distributing amplifier 40 associated with each input port 20. Each distributing amplifier 40 receives a signal from its associated input port 20 and makes multiple copies of the input signal 22 to be forwarded to one or more filter units 50. Each distributing amplifier 40 may make a copy of its associated input signal 22 for each of the filter units 50 in OXC 10 (so as to allow any input channel to be forwarded to any output signal 32). However, any other suitable number of copies of an input signal 22 may be made by each distributing amplifier 40. Although not illustrated for ease of viewing, each distributing amplifier 40 may include one or more amplifiers positioned in the fiber span between any two couplers 70 and/or between a coupler 70 and a filter unit 50 to amplify the copies of an input signal 22 made by the distributing amplifier 40. Any suitable amplifiers may be used for this purpose.

Each distributing amplifier 40 uses a series of optical couplers 70 to make the copies of the associated input signal 22. Optical couplers 70 may each comprise an optical fiber coupler or other optical device operable to combine and/or split an optical signal. As used herein, the terms "optical coupler" and "coupler" refer to any device operable to combine or otherwise generate a combined optical signal based on two or more input optical signals without multiplexing and/or operable to split or divide an input optical signal into discrete optical signals based on the input optical signal without demultiplexing. The discrete signals may be similar or identical in frequency, form, and/or content. For example, the discrete signals may be identical in content and identical or substantially similar in power, may be identical in content and differ substantially in power, or may differ slightly or otherwise in content.

In the illustrated embodiment, the couplers 70 of each distributing amplifier 40 are 1×2 couplers that split an input signal into two copies with substantially equal power and substantially identical content. The couplers 70 are cascaded such that a first coupler 70 receives the associated input signal 22 and creates two copies of the signal. Each of these copies is then forwarded to different couplers 70, each of which makes a copy of the received copy. In this manner, four copies of each input signal 22 are created by each distributing amplifier 40. However, any appropriate number of couplers 70 may be used to create any suitable number of copies. For example, in embodiments in which a copy of each input signal 22 is made for each filter unit 50, each distributing amplifier 40 will have a suitable number of couplers to make these copies. Therefore, although a "two-tier" cascade of couplers 70 is shown for each distributing amplifier 40, any number of tiers may be used. Furthermore, in certain embodiments, couplers may be used that create more than two copies of the signal received by the coupler. The use of such couplers may therefore reduce the number of couplers used in each distributing amplifier 40.

The copies of the associated input signal 22 that are generated at each distributing amplifier 40 are forwarded from the distributing amplifier 40 to one or more filter units 50. For example, in the illustrated embodiment, a copy is forwarded to each of the filter units 50. Filter units 50 comprise one or more filters that forward particular channels of each signal received by the filter unit 50 (the copies of the various input signals 22*a*–22*d*). As described in further detail with reference to FIG. 2, in particular embodiments, each filter unit 50 may include a separate filter associated with each incoming signal. In such a case, each filter is configured to forward (pass) one or more channels of the associated input signal and to terminate (reject) the remaining channels. For example, if the traffic in a first channel of input signal 22*a* is to be forwarded or "switched" to output port 30*c*, then the filter of filter unit 50*c* that receives the copy of input signal 22*a* will be configured to forward the first channel of this signal. This channel (along with any other channels of input signal 22*a* that are also forwarded) will then be output from filter unit 50*c* to combining amplifier 60*c*. Selected channels of the other input signals 22*b*–22*d* may similarly be forwarded by associated filters of filter unit 50*c* and be output to combining amplifier 60*c*. Further details regarding the operation of filter units 50 are provided below with reference to FIG. 2.

As described above, the selected channels of the various input signals 22 that are output by each filter unit 50 are forwarded to an associated combining amplifier 60. As with distributing amplifiers 40, combining amplifiers 60 are comprised of one or more couplers 70. However, instead of splitting a received signal into multiple copies of that signal, combining amplifiers 60 operate in a reverse fashion to combine multiple signals received from the associated filter unit 50 into a single signal. For example, in the illustrated embodiment, filter unit 50*a* may forward particular channels from each of signals 22*a*–22*d* to combining amplifier 60*a*. A first coupler 70 of combining amplifier 60*a* may combine the forwarded channels from signal 22*a* with those from signal 22*b*, and a second coupler 70 may combine the forwarded channels from signal 22*c* with those from signal 22*d*. A third coupler 70 may then combine these two combined signals into a signal comprising the forwarded channels from all of signals 22*a*–22*d*. This is the output signal 32*a* that is forwarded from the associated output port 32*a*. As with distributing amplifiers 40, combining amplifiers 60 may include an appropriate number and type of couplers 70. Furthermore, combining amplifiers 60 may also include amplifiers to amplify the signals being combined in combining amplifiers 60.

In operation, OXC 10 receives multiple input signals 22 that each contain multiple channels of traffic. A copy of each of these signals is forwarded to one or more filter units 50 that are each associated with a different output port 30. Each filter unit 50 then selects (through filtering) one or more (or no) channels from each received input signal 22 to forward to its associated output port 30. This filtering may be performed such that the same channel from two different input signals 22 will not be forwarded by a filter unit 50 (to prevent interference). The selected channels of each of the input signals 22 are then forwarded from each filter unit 50, are combined using the associated combining amplifier 60, and are forwarded from an associated output port 30 as an output signal 32. In this manner, any channel of any input signal 22 may be output from any output port 30 of OXC 10. It should be understood that although four input ports 20 (and associated signals 22) and four output ports 30 (and associated signals 32) are illustrated, any appropriate number of input ports and output ports may be implemented. Furthermore, the number of input ports 20 need not equal the number of output ports 30 and the OXC 10 may not necessarily be configured to forward selected channels from every input port 20 to every output port 30.

Figure 2:
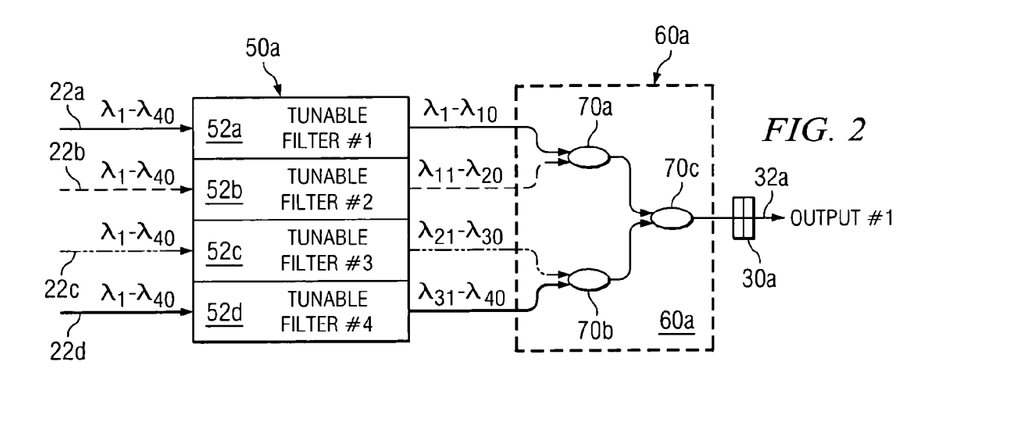
FIG. 2 is a block diagram illustrating a filter unit and a combining amplifier of an example optical cross-connect in further detail.

FIG. 2 is a block diagram illustrating filter unit 50a and combing amplifier 60a of OXC 10 in further detail. Combing amplifier 50a includes four separate tunable filters 52 (although other appropriate types of filters may be used and/or other appropriate numbers of filters may be used to make OXC 10 scalable)—one filter 52 for each incoming copy of an input signal 22. More specifically, in the illustrated embodiment, filter 52a receives a copy of input signal 22a (from distributing amplifier 40a of OXC 10), filter 52b receives a copy of input signal 22b (from distributing amplifier 40b of OXC 10), filter 52c receives a copy of input signal 22c (from distributing amplifier 40c of OXC 10), and filter 52d receives a copy of input signal 22d (from distributing amplifier 40d of OXC 10). It will be understood, however, that any suitable number of filters 52 may be implemented and any appropriate number of signals 22 may be received.

Filters 52 may comprise tunable filters (such as acoustic optical tunable filters), filters using virtually imaged phased array technology, thin-film filters, fixed filters, or any other suitable filters. Furthermore, each filter 52 may comprise a single filter or a plurality of filters connected serially, in parallel, or otherwise. Filters 52 may also be used to filter out amplified spontaneous emissions (ASE).

In operation, the filters 52 of the example filter unit 50a each receive their respective input signal 22. Each filter 52 is configured to allow selected channels of the input signal to pass through the filter 52. As described above, the channels that are passed through each filter 52 are the channels that are desired to be combined and output as output signal 32a. As an example only and not by way of limitation, assuming that each input signal 22 includes forty occupied channels (which may often not be the case), tunable filter 52a may be configured to forward the first group of ten channels of input signal 22a ("$\lambda_1$–$\lambda_{10}$"), tunable filter 52b may be configured to forward the second group of ten channels of input signal 22b ("$\lambda_{11}$–$\lambda_{20}$"), tunable filter 52c may be configured to forward the third group of ten channels of input signal 22c ("$\lambda_{21}$–$\lambda_{30}$"), and tunable filter 52d may be configured to forward the last group of ten channels of input signal 22d ("$\lambda_{31}$–$\lambda_{40}$"). Obviously, any other suitable combination of channels may be selected from each input signal 22, and output signal 32a does not need to have every available channel occupied with traffic. In an "extreme" case, any of filters 52a–52d may be configured to forward all of the signals ($\lambda_1$–$\lambda_{40}$).

Continuing with the example above, filter 52a forwards $\lambda_1$–$\lambda_{10}$ of signal 22a to coupler 70a of combining amplifier 60a, and filter 52b also forwards $\lambda_{11}$–$\lambda_{20}$ of signal 22b to coupler 70a. Coupler 70a combines those two signals. Furthermore, filter 52c forwards $\lambda_{21}$–$\lambda_{30}$ of signal 22c to coupler 70b, and filter 52d also forwards $\lambda_{31}$–$\lambda_{40}$ of signal 22d to coupler 70b. Coupler 70b combines those two signals. The combined signals are then forwarded from couplers 70a and 70b to coupler 70c, which combines the two received signals into an output signal 32a. As described above, any suitable number of couplers 70 may be used to combine the selected channels from each input signal 22. Furthermore, amplifiers may be used to amplify any of the signals forwarded through combining amplifier 60a to compensate for coupler and filter losses and to provide power level control.

Figure 3:
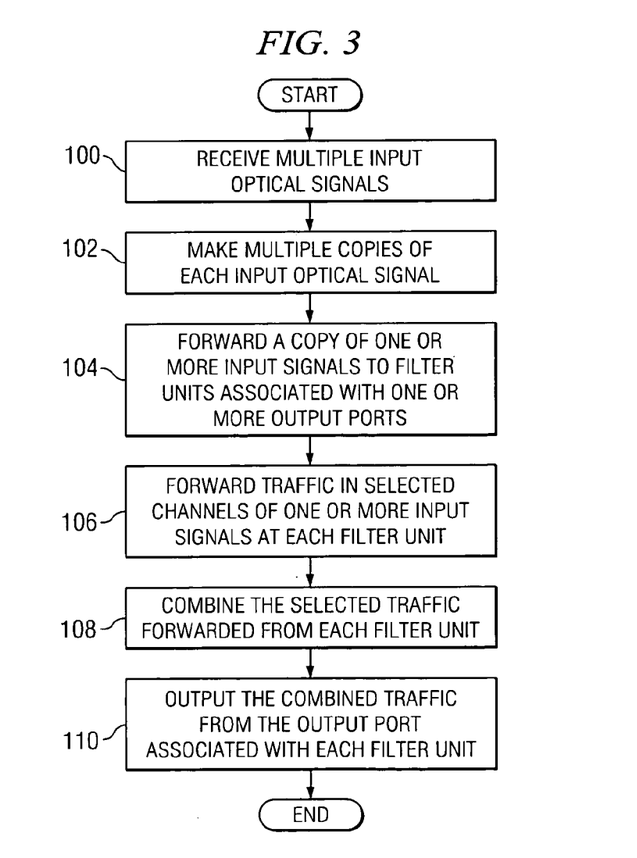
FIG. 3 is a flowchart illustrating an example method for cross-connecting optical signals.

FIG. 3 is a flowchart illustrating an example method for cross-connecting optical signals. The method begins at step 100 where multiple input optical signals are received at an OXC or similar device. At step 102, multiple copies are made of each input optical signal. As described above, couplers may be used to make these copies. At step 104, a copy of one or more of the input signals are forwarded to a number of filter units associated with one or more output ports. In an example embodiment, a copy of each input signal is forwarded to each filter unit so that any portion of any input signal may be output from any output port. However, it is not necessary that this be performed. At step 106, each filter unit forwards the traffic in selected channels of one or more of the input signals (of which a copy of which was received by the filter unit). The traffic in the other, non-selected channels may be terminated. At step 108, the traffic in each of the input signal channels forwarded by a particular filter unit is combined, and the combined traffic is communicated as an output signal from an output port associated with each filter unit at step 110. In this manner, traffic in a particular channel of an input signal may be forwarded to a desired output port to be communicated as part of the associated output signal.

Figure 4:
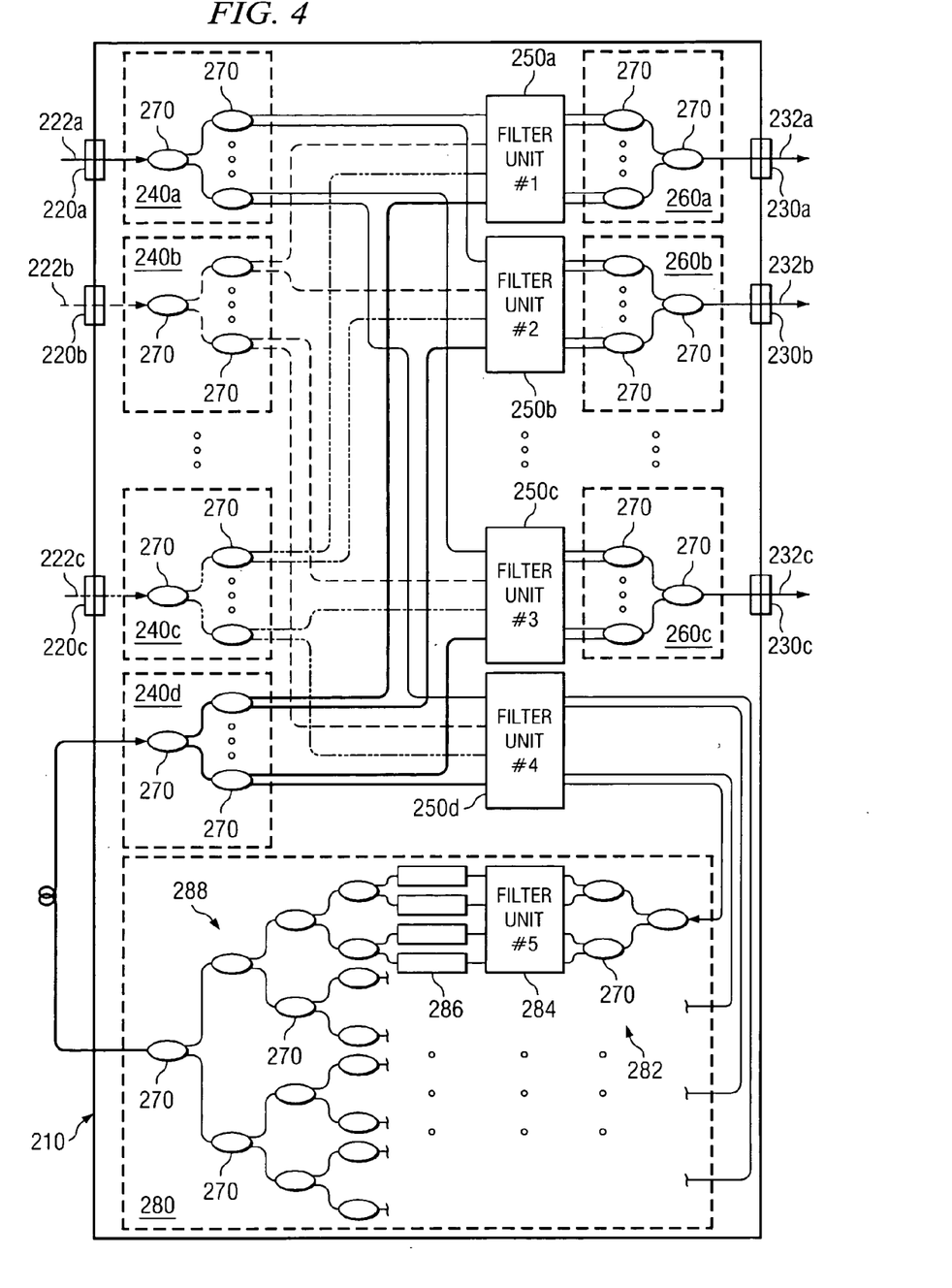
FIG. 4 is a block diagram illustrating an optical cross-connect having a regeneration loop in accordance with one embodiment of the present invention.

FIG. 4 is a block diagram illustrating an OXC 210 having a regeneration loop in accordance with one embodiment of the present invention. As an example only, OXC 210 includes three input ports 220a–220c that are operable to receive three different input signals 222a–222c. Although three input ports 220 and input signals 222 are illustrated, any suitable number of ports 220 and signals 222 may be implemented and/or used. In certain embodiments, each input signal 222 may compromise a signal received over an optical fiber that is coupled to the corresponding input port 220. Each input signal 222 may comprise a number of channels that are each able to carry separate traffic. As with OXC 10, the traffic in each channel of a particular input signal 222 may be forwarded or "switched" by OXC 210 to any of a number of output ports 230a–230c and be communicated as a part of an associated output signal 232a–232c.

As with OXC 10, OXC 210 includes a distributing amplifier 240a–240c associated with each input port 220. Each distributing amplifier 240 receives a signal from its associated input port 220 and makes multiple copies of the input signal 222 to be forwarded to one or more filter units 250. OXC 210 also includes a distributing amplifier 240d associated with a regeneration module 280, which is described in further detail below. Each distributing amplifier 240 may include one or more amplifiers positioned in the fiber span between any two couplers 270 and/or between a coupler 270 and a filter unit 250 to amplify the copies of an input signal 222 made by the distributing amplifier 240. Any suitable amplifiers may be used for this purpose. Distributing amplifiers 240 may be constructed and may operate in an identical or substantially similar fashion as distributing amplifiers 40 of OXC 10.

As with OXC 10, the copies of the associated input signal 222 that are generated at each distributing amplifier 240 are forwarded from the distributing amplifier 240 to one or more filter units 250. As with filter units 50 of OXC 10, each filter unit 250 may include a separate filter associated with each incoming signal. In such a case, each filter is configured to forward one or more channels of the associated input signal and to terminate the remaining channels. Filter units 250 may be constructed and may operate in an identical or substantially similar fashion as filter units 50 of OXC 10.

The selected channels of the various input signals 222 that are output by filter units 250a–250c are forwarded to an associated combining amplifier 260. As with combining amplifiers 60 of OXC 10, combining amplifiers 260 combine multiple signals received from the associated filter unit 250 into a single signal. This signal is then forwarded to the associated output port 230. Combining amplifiers 260 may be constructed and may operate in an identical or substantially similar fashion as combining amplifiers 60 of OXC 10.

As mentioned above, in addition to components similar to those described in relation to OXC 10, OXC 210 also includes a regeneration module 280. Regeneration module 280 is operable to receive selected channels output by filter unit 250d and to regenerate and convert the wavelength of the channels received at regeneration module 280. Regeneration module 280 includes one or more distributing amplifiers 282 (which may be identical or similar to distributing amplifiers 240) that make multiple copies of each input signal received from filter unit 250d, and one or more filter units 284 (which may be identical or similar to filter units 250) that forward one or more channels of the associated input signal. In particular embodiments, distributing amplifiers 282 and filter units 284 may be replaced by a demultiplexer.

Regeneration module 280 also includes one or more transponders 286 (or any other suitable signal regenerators) that regenerate the signals received from an associated filter unit 284. Transponders 286 may perform any suitable type of regeneration, including 2R (amplification and re-shaping) and 3R (amplification, re-shaping, and re-timing) regeneration. In addition, transponders 286 may convert the wavelength of one or more of the received signals. Regeneration module 280 further includes one or more combining amplifiers 288 that receive the signals forwarded from transponders 286 and combine the signals into a single signal that is forwarded to distributing amplifier 240d.

In operation, as with OXC 10, OXC 210 receives multiple input signals 222 that each contain multiple channels of traffic. A copy of each of these signals 222 may be forwarded by distributing amplifiers 240a–240c to one or more filter units 250a–250c that are each associated with a different output port 230. Each filter unit 250a–250c then selects (through filtering) one or more (or no) channels from each received input signal 222 to forward to its associated output port 230. The selected channels of each of the input signals 222 are then forwarded from each of filter units 250a–250c, are combined using the associated combining amplifier 260, and are forwarded from an associated output port 230 as an output signal 232.

In addition to the cross-connect operation described above, OXC 210 may also regenerate and/or wavelength convert the traffic in one or more channels of one or more of input signals 222. This regeneration feature is implemented though the use of distributing amplifier 240d, filter unit 250d, and regeneration module 280. As illustrated in FIG. 4, distributing amplifiers 240a–240c may each forward a copy of the associated input signal to filter unit 250d. Filter unit 250d may be configured to forward selected channels from one or more of the input signals 222 to regeneration module 280 for regeneration and/or wavelength conversion. The selected channels from each input signal 222 are received at regeneration module 280. The channels in each signal received at regeneration module 280 may be separated using distributing amplifiers 282 and filter units 284 or using a demultiplexer.

The traffic in the separated channels is then forwarded to the one or more transponders 286. As described above, transponders 286 regenerate and possibly convert the wavelength of the received traffic. For example, the traffic in some of the channels may regenerated and the traffic in other channels may be regenerated and wavelength converted. The regenerated traffic is forwarded from transponders 286 to one or more combining amplifiers 288 which combine the regenerated traffic into a single signal. This signal is then forwarded to distributing amplifier 240d. In the illustrated embodiment, distributing amplifier 240d generates copies of the received signal and forwards a copy to each of filter units 250a–250c. Filter units 250a–250c may each be configured to forward the traffic selected channels from the regenerated signal to their associated combining amplifiers 260a for incorporation into the associated output signal 232.

As an example, traffic in a first channel of input signal 222a may be received at input port 220 of OXC 210 and copies of input signal 222a may be forwarded to each of filter units 250a–250d. Assuming that the traffic needs to be regenerated and/or wavelength converted before forwarding to one or more of output ports 232, the traffic in that channel is terminated by the filter of filter units 250a–250c that received a copy of input signal 222a. However, the traffic is forwarded by filter unit 250d (although it should be noted that the traffic may be forwarded to one or more output ports 232 without being regenerated or wavelength converted and be forwarded to one or more different output ports 232 after being regenerated and/or wavelength converted). The traffic in the first channel of input signal 222a is then forwarded from filter unit 250d to regeneration module 280, where it is regenerated and possibly converted to another channel/wavelength. The regenerated traffic is then combined with other regenerated traffic and forwarded to distributing amplifier 240d, which forwards a copy of the regenerated traffic to each filter unit 250. Since a different filter of filter units 250 receive the signal from distributing amplifier 240a than the filter that received input signal 222a, the regenerated traffic from the first channel of input signal 222a may be forwarded by that filter to the associated combining amplifier 260 for communication from the associated output port 230. Alternatively, the wavelength/channel in which the traffic is communicated may have been changed by regeneration module 280, and the receiving filter of one or more of filter units 250a–250c may be configured to forward the regenerated and wavelength converted traffic to the associated combining amplifier 260 for communication from the associated output port 230.

In this manner, any channel of any input signal 222 may be output from any output port 230 of OXC 210. Furthermore, the traffic in one or more of these channels may regenerated and/or wavelength converted before it is output. It should be understood that although three input ports 220 (and associated signals 222) and three output ports 230 (and associated signals 232) are illustrated, any appropriate number of input ports and output ports may be implemented. Furthermore, the number of input ports 220 need not equal the number of output ports 230 and the OXC 210 may not necessarily be configured to forward selected channels from every input port 220 to every output port 230.

Figure 5:
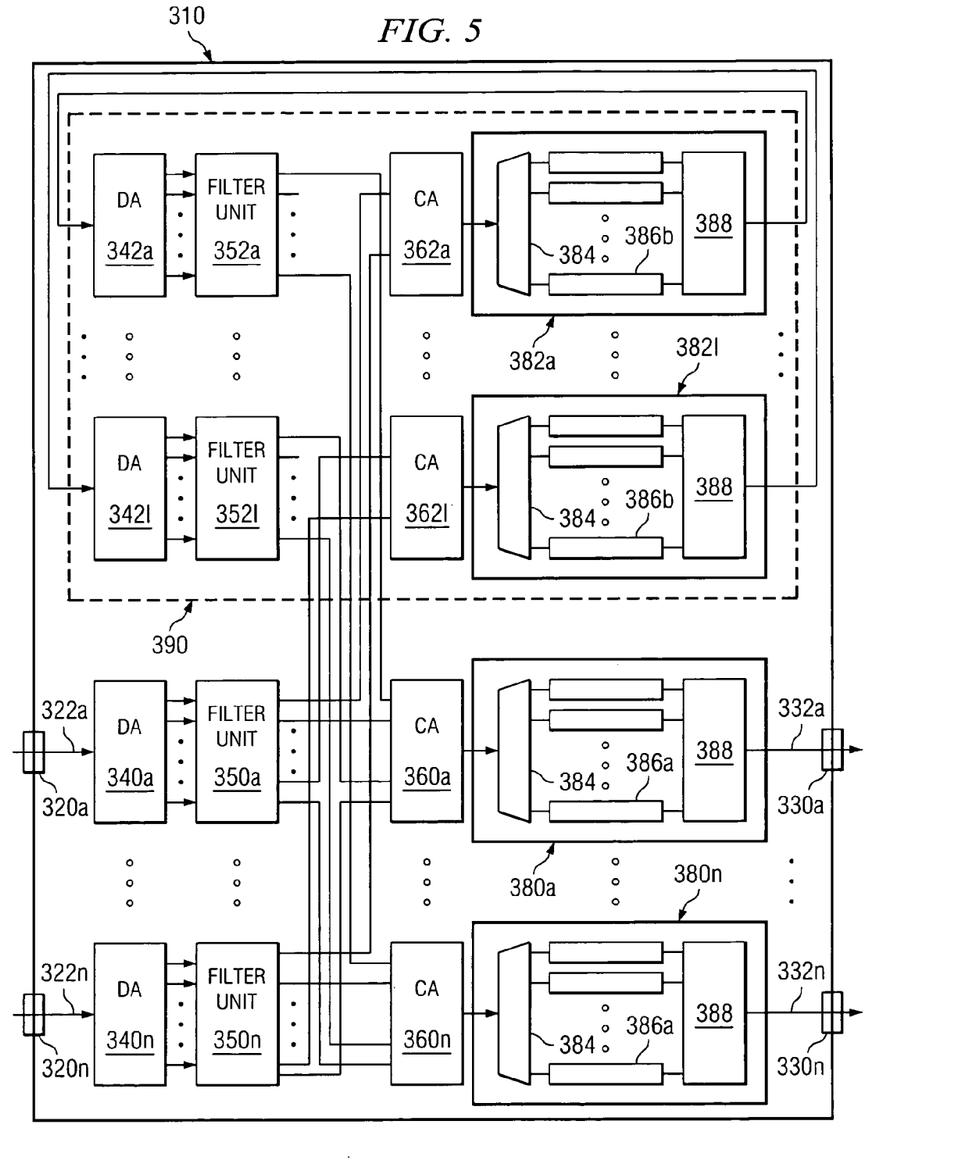
FIG. 5 is a block diagram illustrating an optical cross-connect having a regeneration loopback unit in accordance with another embodiment of the present invention.

FIG. 5 is a block diagram illustrating an OXC 310 having a regeneration loopback unit 390 in accordance with another embodiment of the present invention. OXC 310 includes n input ports 320a–320n and n associated input signals 322a–322n. OXC 310 may be configured such that the traffic in a particular channel of an input signal 322 may either be passed directly to one or more output ports 330 (via regeneration units 380) or may first be forwarded through regeneration loopback unit 390 before being output from one or more of output ports 330.

Unlike OXC 210, OXC 310 includes components for implementing two different types of regeneration. The first such components are regeneration modules 380. These regeneration modules 380 may perform regeneration (for example, 2R or 3R regeneration) on all traffic that is to be output from OXC 310. As is illustrated there may be n regeneration modules 380 included in OXC 310—one module 380 for each output port 330. The other regenerating components of OXC 310 are regeneration modules 382. Regeneration modules 382 perform wavelength conversion, in addition to regeneration, on selected traffic that is forwarded to regeneration loopback unit 390 of OXC 310. Since not all traffic is forwarded to a regeneration module 382, OXC 310 may include l modules 382, where l is less than n.

Regeneration modules 380 and 382 may each include a demultiplexer 384 (or they may use distributing amplifiers and filter units, as illustrated in FIG. 4) that separates a received signal into its constituent channels, a series of transponders 386 that regenerate and/or wavelength convert the traffic in the constituent channels of the received signal, and a combining amplifier 388 that combines the regenerated traffic. In particular embodiments, the type of regeneration performed by transponders 386a of modules 380 and transponders 386b of modules 382 may differ. For example, transponders 386a may perform 2R regeneration and transponders 386b may perform 3R regeneration, or vice versa. In addition, as mentioned above, transponders 386b may perform wavelength conversion, while transponders 386a may not. Furthermore, in particular embodiments, regeneration modules 380 may not included.

OXC 310 includes a series of distributing amplifiers 340 and 342, filter units 350 and 352, and combining amplifiers 360 and 362 to receive and forward selected traffic to particular regeneration modules 380 and 382. More specifically, OXC 310 includes a number of distributing amplifiers 340 that each receive a different input signal 322 and generate multiple copies of that signal. Although shown in FIG. 5 in block format for ease of illustration, distributing amplifiers 340 may be constructed and operate identically or similarly to the distributing amplifiers described above.

The multiple copies of each input signal 322 are forwarded from the associated distributing amplifier 340 to an associated filter unit 350. Filter units 350 may be constructed and operate identically or similarly to the filter units described above so as to forward traffic in selected channels from one or more of the received copies. Unlike the filter units described above, filter units 350 each receive multiple copies of one input signal 322 instead of each receiving one copy of multiple input signals 322. However, this is simply a matter of implementation and either configuration may be used in conjunction with any suitable embodiments of the present invention. Each filter unit 350 of the illustrated embodiment may forward traffic in selected channels of the received copies to any suitable combination of combining amplifiers 360 and/or 362.

Certain traffic forwarded by one or more filter units 350 may be communicated to one or more combining amplifiers 360. Combining amplifiers 360 may be constructed and operate identically or similarly to the combining amplifiers described above so as to combine multiple received signals into a single signal. As is illustrated in FIG. 5, combining amplifiers 360 may receive signals from both filter units 350 and filter units 352 of regeneration loopback unit 390, as described below. The combined signal from each combining amplifier 360 is communicated to an associated regeneration module 380, which regenerates the traffic in the constituent channels of the received signal as described above. The combining amplifier 388 of each regeneration module 380 combines the regenerated traffic and forwards the combined traffic to the associated output port 330 for communication as an output signal 332.

Other traffic forwarded by one or more filter units 350 may be communicated to one or more combining amplifiers 362 included in regeneration loopback unit 390. Combining amplifiers 362 may be constructed and operate identically or similarly to the combining amplifiers described above so as to combine multiple received signals into a single signal. The traffic received at each combining amplifier 362 (traffic in selected channels from one or more filter units 350) is combined into a single signal and forwarded to an associated regeneration module 382. The regeneration module 382 operates as described above to regenerate and potentially wavelength convert the traffic in the constituent channels of the received signal. The combining amplifier 388 of each regeneration module 382 combines the regenerated traffic and forwards the combined traffic to an associated distributing amplifier 342.

Distributing amplifiers 342 may be constructed and operate identically or similarly to the distributing amplifiers described above. Each distributing amplifier 342 generates multiple copies of the received signal from the associated regeneration module 382 and forwards the copies to an associated filter unit 352. Filter units 352 may be constructed and operate identically or similarly to the filter units described above so as to forward traffic in selected channels from one or more of the received copies to particular combining amplifiers 360, depending on the output port 330 to which the traffic in a particular channel is to be communicated. As described above, combining amplifiers 360 combine the traffic received from one or more filter units 352 with other traffic received from filter units 350 and forward the combined traffic to the associated output port 330.

In this manner, OXC 310 has capabilities similar to the OXCs described above to allow any channel of any input signal 322 to be forwarded to any output port 330 of OXC 310 (although OXC 310 may be configured such that some or all of input signals 322 may be forwarding to less than all of output ports 330). Furthermore, OXC 310 adds the additional capability of forwarded selected channels from selected input signals 322 to regeneration loopback unit 390. Since only selected channels of selected input signals 322 may require the regeneration and/or wavelength conversion provided by regeneration loopback unit 390, the ability to forward only selected signals to regeneration loopback unit 390 allows that unit to have less regeneration modules 382 than would be required if all channels of input signals 322 needed regeneration (as may be the case with regeneration modules 380). Therefore, OXC 310 provides a cost savings over prior optical cross-connects.

Figure 6:
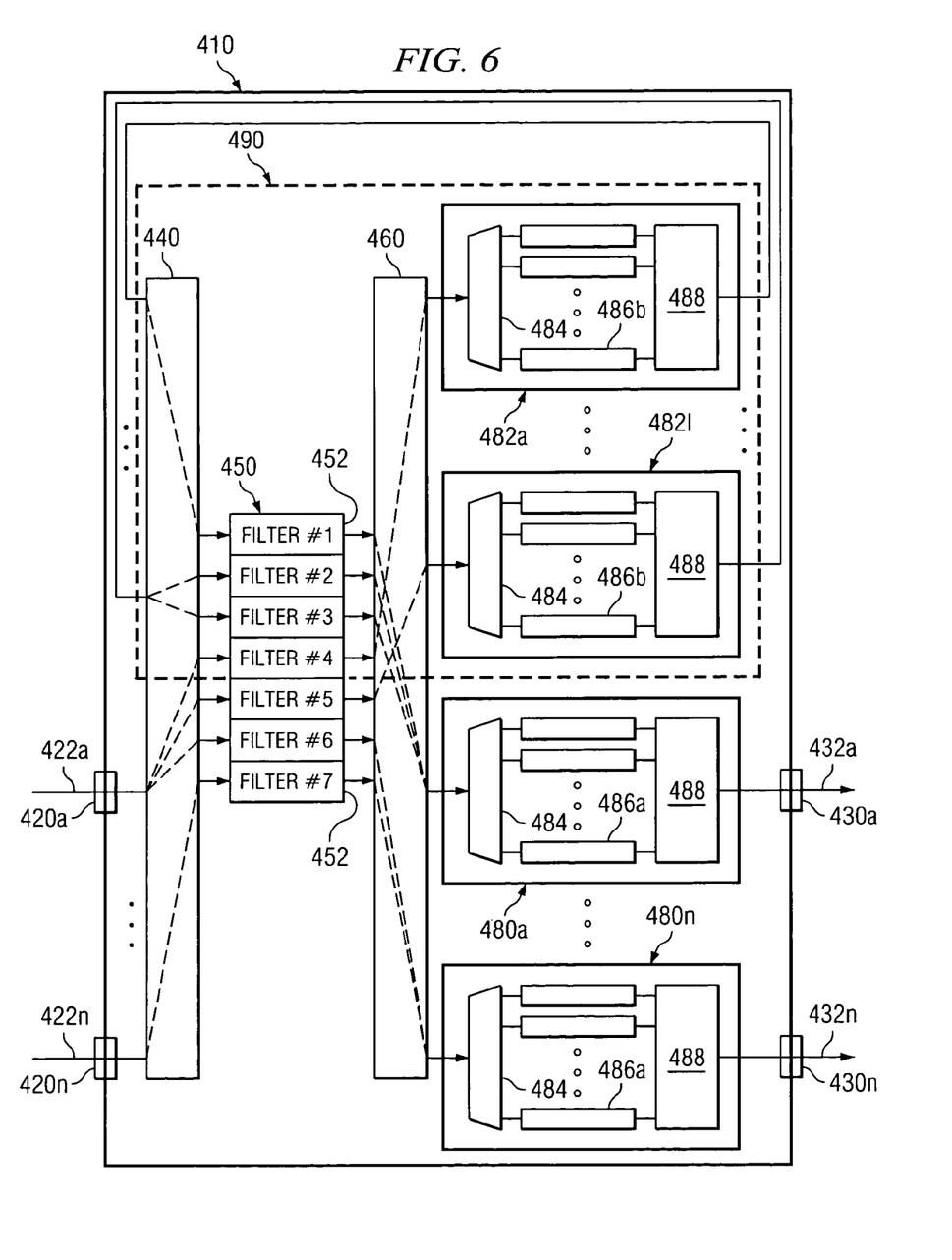
FIG. 6 is a block diagram illustrating an optical cross-connect having a common filter unit and switches in accordance with another embodiment of the present invention.

FIG. 6 is a block diagram illustrating an OXC 410 having a common filter unit 450 and switches 440 and 460 in accordance with another embodiment of the present invention. OXC 410 includes a regeneration loopback unit 490 similar in operation to regeneration loopback unit 390 of OXC 310. The primary difference between OXC 310 and OXC 410 is that OXC 410 replaces distributing amplifiers 340 with a single multicasting switch 440, replaces filter units 350 with a single filter unit 450, and replaces combining amplifiers 360 with a single combining switch 460. Therefore, instead of each input port and regeneration loop having a separate distributing amplifier, filter unit, and combining amplifier the, input ports and the regeneration loops share a common multicasting switch 440, filter unit 450, and combining switch 460.

More specifically, OXC 410 includes n input ports 420a–420n and n associated input signals 422a–422n. OXC 410 may be configured such that the traffic in a particular channel of an input signal 422 may either be passed directly to one or more output ports 430 (via regeneration units 480) or may first be forwarded through regeneration loopback unit 490 before being output from one or more of output ports 430.

As with OXC 310, OXC 410 includes components for implementing two different types of regeneration. The first such components are regeneration modules 480. These regeneration modules 480 may perform regeneration (for example, 2R or 3R regeneration) on all traffic that is to be output from OXC 410. As is illustrated there may be n regeneration modules 480 included in OXC 410—one module 480 for each output port 430. The other regenerating components of OXC 410 are regeneration modules 482. Regeneration modules 482 perform wavelength conversion, in addition to regeneration, on selected traffic that is forwarded to regeneration loopback unit 490 of OXC 410. Since not all traffic is forwarded to a regeneration module 482, OXC 410 may include l modules 482, where l is less than n. Regeneration modules 480 and 482 may each include a demultiplexer 384 (or they may use distributing amplifiers and filter units), a series of transponders 386, and a combining amplifier 388. Regeneration modules 480 and 482 may be constructed and operate identically or similarly to transponders 380 and 382, respectively. In particular embodiments, regeneration modules 480 may not included.

As mentioned above, OXC 410 includes a multicasting switch 440, a filter unit 450, and a combining switch 460 that operate together to receive and forward selected traffic to particular regeneration modules 480 and 482. Multicasting switch 440 is operable to receive multiple inputs and to switch each those input to one or more outputs. As implemented in OXC 410, the inputs to switch 440 include both input signals 422 and the signal received from each transponder 482. The outputs from switch 440 are the signals sent to filter unit 450. In addition to performing this switch function, switch 440 is also operable to multicast a single input to multiple outputs, as illustrated in FIG. 6. In particular embodiments, switch 440 is a planar lightwave circuit (PLC) switch having multicasting capability (for example, a Photon.PCSS® switch manufactured by Lynx Photonics Networks®); however, any suitable switch may be used.

As described above, the signals output from multicasting switch 440 are each forwarded to filter unit 450. Unlike the OXCs described above, OXC 410 includes a single filter unit 450 which includes a bank of filters 452. Filters 452 may be constructed and operate similarly to the filters of the filter units described above. Since the example OXCs described above generate an equal number of copies of each input signal (or at least have the ability to do so), those embodiments included a filter for each copy of each input signal. However, if creating this many copies may not be necessary for certain applications, a shared filter unit 450 may be used. Filter unit 450 provides a cost savings since only the needed number of filters 452 need to be installed and provides flexibility since filters 452 can be added and removed as needed. Although a particular number of filters 452 are illustrated, any suitable number of filters 452 may be used.

OXC 410 further includes a combining switch 460 that receives the traffic output from filter unit 450 and switches each of the inputs (a combination of the inputs) to a particular output. Each output may be forwarded to a regeneration module 480 or 482. Switch 460 may be constructed and operate similarly to switch 440, except that it combines inputs instead of multicasting inputs. The same type of device may be used for both switches 440 and 460.

In operation, input signals 422 are received at input ports 420. Each input signal is forwarded to multicasting switch 440, where it is switched to one or more outputs of switch 440. The signal from each output of switch 440 is forwarded to an associated filter 452, which forwards selected channels from the received input signal 422. The selected channels are forwarded from each filter 452 to an associated input of combining switch 460. Combining switch 460 forwards the selected traffic received at each input to either a regeneration module 480 or 482. As described above, the traffic received at multiple inputs of switch 460 may be combined and forwarded to a single output of switch 460. The traffic forwarded to regeneration modules 480 is regenerated and then output from the associated output port 430. The traffic forwarded to regeneration modules 482 may be regenerated and wavelength converted, as described above, and then be forwarded back to multicasting switch 440. This traffic may then be forwarded via switch 440, filter unit 450, and switch 460 to a particular regeneration module 480 to be regenerated and output from a desired output port 430.

In this manner, OXC 410 has capabilities similar to the OXCs described above to allow any channel of any input signal 422 to be forwarded to any output port 430 of OXC 410 (although OXC 410 may be configured such that some or all of input signals 422 may be forwarded to less than all of output ports 430). Furthermore, as with OXC 310, OXC 410 also may forward selected channels from selected input signals 422 to regeneration loopback unit 490. Since only selected channels of selected input signals 422 may require the regeneration and/or wavelength conversion provided by regeneration loopback unit 490, the ability to forward only selected signals to regeneration loopback unit 490 allows that unit to have less regeneration modules 482 than would be required if all channels of input signals 422 needed regeneration (as may be the case with regeneration modules 480). Therefore, OXC 410 provides a cost savings over prior optical cross-connects.

Figure 7:
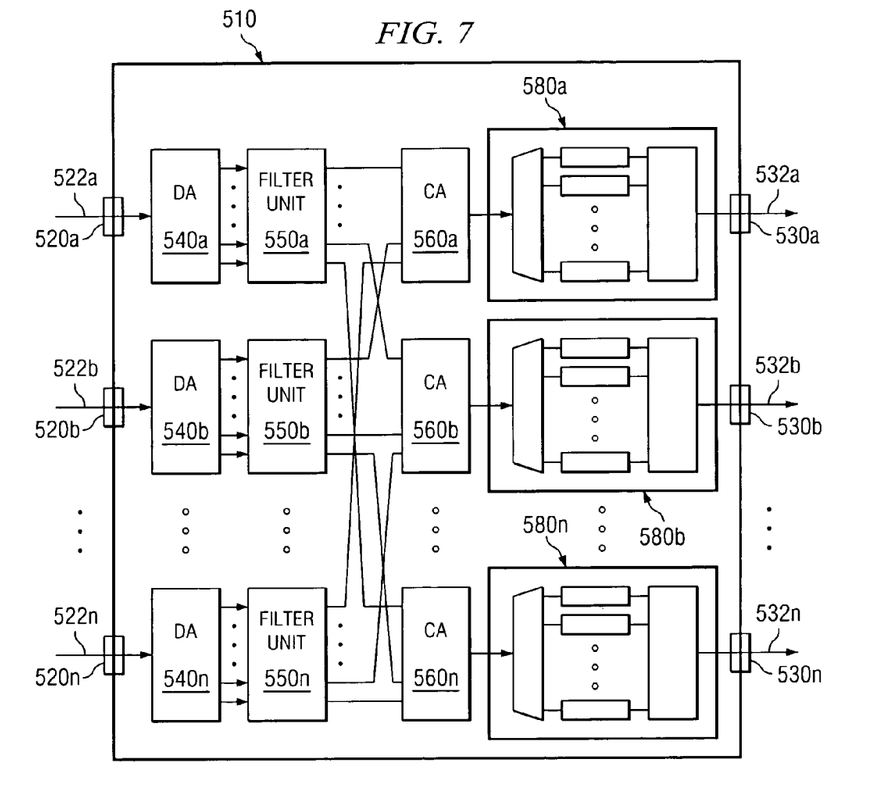
FIG. 7 illustrates an optical cross-connect in accordance with yet another embodiment of the present invention.

FIG. 7 illustrates an OXC 510 in accordance with yet another embodiment of the present invention. OXC 510 includes many similar components as OXC 310, except that it does not include a regeneration loopback unit. Instead, every signal forwarded to an output 530 of OXC 510 goes through a single regeneration (and possibly wavelength conversion).

OXC 510 includes a number of distributing amplifiers 540 that each receive a different input signal 522 and generate multiple copies of that signal. Although shown in FIG. 7 in block format for ease of illustration, distributing amplifiers 540 may be constructed and operate identically or similarly to the distributing amplifiers described above. The multiple copies of each input signal 522 are forwarded from the associated distributing amplifier 540 to an associated filter unit 550. Filter units 550 may be constructed and operate identically or similarly to the filter units described above so as to forward traffic in selected channels from one or more of the received copies. Each filter unit 550 of the illustrated embodiment may forward traffic in selected channels of the received copies to one or more combining amplifiers 560.

Combining amplifiers 560 may be constructed and operate identically or similarly to the combining amplifiers described above so as to combine multiple received signals into a single signal. The combined signal from each combining amplifier 360 is communicated to an associated regeneration module 580, which regenerates the traffic in the constituent channels of the received signal. Regeneration modules 580 may each include a demultiplexer (or they may use distributing amplifiers and filter units, as illustrated in FIG. 4) that separates a received signal into its constituent channels, a series of transponders that regenerate and/or wavelength convert the traffic in the constituent channels of the received signal, and a combining amplifier that combines the regenerated traffic. The transponders may perform any suitable type of regeneration (such as 2R or 3R). In addition, as mentioned above, the transponders may perform wavelength conversion on some or all of the received traffic. The combining amplifier of each regeneration module 580 combines the regenerated traffic and forwards the combined traffic to the associated output port 530 for communication as an output signal 532. Although, regeneration units 580 are illustrated as being positioned between combining amplifiers 580 and output ports 530, in other embodiments transponders 580 may instead be positioned between input ports 520 and distributing amplifiers 540 and thus may regenerate and/or wavelength convert the traffic in the constituent channels of each input signal 522 before the input signal is received by distributing amplifiers 540.

In this manner, OXC 510 has the ability to allow any channel of any input signal 522 to be forwarded to any output port 530 (although OXC 510 may be configured such some or all of input signals 522 may be forwarded to less than all of output ports 530). Furthermore, OXC 510 regenerates and possibly wavelength coverts the selected traffic forwarded by each combining amplifier 560 (or regenerates the input signals before they are distributed).

In particular embodiments of the OXCs described above, the various components of the OXC may each be implemented as a discrete card and may be interconnected through a backplane of a card shelf. Alternatively, the functionality of one or more of these components may be distributed across a plurality of discrete cards. In this way, the OXCs are modular, upgradeable, and provide a "pay-as-you-grow" architecture. The components of the OXCs may be coupled by direct, indirect, or other suitable connection or association. The elements and devices in the elements may be connected using optical fiber connections, planar wave guide circuits, free space optics, and/or using any other suitable technique. Furthermore, components and features of any of the OXCs described above may be combined in any suitable manner to provide selected benefits in appropriate circumstances.

Although the present invention has been described with several embodiments, various changes and modifications may be suggested to one skilled in the art. It is intended that the present invention encompass such changes and modifications as fall within the scope of the appended claims.

What is claimed is:

1. An optical cross-connect comprising:
   a plurality of input ports each operable to receive an optical input signal, each input signal comprising a plurality of channels that are each operable to carry optical traffic;
   a plurality of output ports each operable to output an optical output signal;
   a distributing amplifier associated with each input port, each distributing amplifier operable to generate a plurality of copies of the input signal received at the associated input port;
   a plurality of filter units each operable to:
      receive a copy of one or more of the input signals from one or more of the distributing amplifiers;
      forward traffic in selected channels of one or more of the copies;
   a combining amplifier associated with each output port, each combining amplifier operable to:
      receive the traffic in one or more channels forwarded by one or more of the filter units; and
      combine the received traffic into an output signal to be output from the associated output port; and
   one or more regeneration modules each operable to regenerate the traffic in one or more channels of one or more of the input signals.

2. The optical cross-connect of claim 1, wherein the regeneration modules each comprise:
   one or more transponders each operable to regenerate traffic in one or more channels; and
   one or more combining amplifiers operable to combine regenerated traffic received from the one or more transponders.

3. The optical cross-connect of claim 2, wherein the regeneration modules each further comprise:
   one or more distributing amplifiers each operable to generate multiple copies of a received signal; and
   one or more filter units each operable to forward traffic in selected channels of one or more of the copies to one or more of the transponders.

4. The optical cross-connect of claim 2, wherein the regeneration modules each further comprise one or more demultiplexers each operable to:
   separate a received signal into traffic in one or more constituent channels of the received signal; and
   forward the traffic in one or more of the channels to one or more of the transponders.

5. The optical cross-connect of claim 1, wherein one or more of the regeneration modules are further operable to convert the wavelength of the traffic in one or more channels of one or more of the input signals.

6. The optical cross-connect of claim 1, wherein one or more of the regeneration modules are each positioned between an associated combining amplifier and an associated output port.

7. The optical cross-connect of claim 1, wherein one or more of the regeneration modules are each positioned between an associated distributing amplifier and an associated input port.

8. The optical cross-connect of claim 1, wherein one or more of the regeneration modules are positioned in a regeneration loop such that only traffic in one or more selected channels of one or more input signals is forwarded to the one or more regeneration modules for regeneration.

9. The optical cross-connect of claim 1, wherein the distributing amplifiers each comprise a plurality of passive optical couplers operable to generate the plurality of copies of the associated input signal.

10. The optical cross-connect of claim 1, wherein the combining amplifiers each comprise a plurality of passive optical couplers operable to combine the received traffic into the associated output signal.

11. The optical cross-connect of claim 1, wherein the filter units are each operable to forward traffic in one or more selected channels by passing the traffic in selected channels and terminating the traffic in the remaining channels.

12. The optical cross-connect of claim 1, wherein each filter unit comprises one or more filters, each filter operable to receive a copy of an input signal and to pass the traffic in selected channels and to terminate the traffic in the remaining channels of the particular input signal.

13. The optical cross-connect of claim 12, wherein the filters comprise tunable filters.

14. An optical cross-connect comprising:
a plurality of input ports each operable to receive an optical input signal, each input signal comprising a plurality of channels that are each operable to carry optical traffic;
a plurality of output ports each operable to output an optical output signal;
a multicasting switch operable to forward one or more of the input signals to one or more filters;
one or more filters each operable to:
receive an input signal from the multicasting switch; and
forward traffic in selected channels of the input signal;
a combining switch operable to:
receive the traffic in one or more channels forwarded by one or more of the filters; and
forward the traffic to one or more regeneration modules; and
one or more regeneration modules each operable to regenerate the traffic in one or more channels forwarded by the combining switch.

15. The optical cross-connect of claim 14, wherein the multicasting switch is operable to forward at least one of the input signals to a plurality of the filters.

16. The optical cross-connect of claim 14, wherein the combining switch is operable to forward traffic received from a plurality of the filters to a single regeneration module.

17. The optical cross-connect of claim 14, wherein the regeneration modules each comprise:
one or more transponders each operable to regenerate traffic in one or more channels; and
one or more combining amplifiers operable to combine regenerated traffic received from the one or more transponders.

18. The optical cross-connect of claim 17, wherein the regeneration modules each further comprise:
one or more distributing amplifiers each operable to generate multiple copies of the traffic received from the combining switch; and
one or more filter units each operable to forward traffic in selected channels of one or more of the copies to one or more of the transponders.

19. The optical cross-connect of claim 17, wherein the regeneration modules each further comprise one or more demultiplexers each operable to:
separate the traffic received from the combining switch into one or more constituent channels; and
forward the traffic in one or more of the channels to one or more of the transponders.

20. The optical cross-connect of claim 14, wherein one or more of the regeneration modules are further operable to convert the wavelength of the traffic in one or more channels of the traffic received from the combining switch.

21. The optical cross-connect of claim 14, wherein one or more of the regeneration modules are positioned in a regeneration loop such that only traffic in one or more selected channels of one or more input signals is forwarded to the one or more regeneration modules for regeneration.

22. The optical cross-connect of claim 14, wherein the filters are each operable to forward traffic in one or more selected channels by passing the traffic in selected channels and terminating the traffic in the remaining channels.

23. The optical cross-connect of claim 14, wherein the filters comprise tunable filters.

24. A method for cross-connecting optical signals, comprising:
receiving an optical input signal at each of a plurality of input ports, each input signal comprising a plurality of channels that are each operable to carry optical traffic;
generating a plurality of copies of one or more of the input signals;
receiving a copy of one or more of the input signals at one or more filter units;
forwarding traffic in selected channels of one or more of the copies received at each filter unit;
combining the traffic received from two or more of the filter units;
forwarding the combined traffic to one or more regeneration modules;
regenerating the traffic received at the regeneration modules; and
forwarding the regenerated traffic to one or more output ports to be output from the output ports.

25. The method of claim 24, further comprising converting the wavelength of the traffic received at the regeneration modules.

26. The method of claim 24, wherein the plurality of copies of one or more of the input signals are generated using a plurality of passive optical couplers.

27. The method of claim 24, wherein the plurality of copies of one or more of the input signals are generated using a multiplexing switch.

28. The method of claim 24, wherein the traffic is combined using a plurality of passive optical couplers.

29. The method of claim 24, wherein the traffic is combined using a combining switch.

30. The method of claim 24, wherein forwarding the traffic in one or more selected channels of a copy of an input optical signal comprises passing the traffic in selected channels of the signal and terminating the traffic in the remaining channels of the signal.

31. An optical cross-connect, comprising:
means for receiving a plurality of optical input signals, each input signal comprising a plurality of channels that are each operable to carry optical traffic;
means for generating a plurality of copies of each input signal;
means for forwarding traffic in selected channels of one or more of the copies to one or more output ports;
means for combining the traffic received at each output port into an optical output signal to be output from the output port; and
means for regenerating the traffic in one or more channels of one or more of the input signals.

* * * * *

UNITED STATES PATENT AND TRADEMARK OFFICE
CERTIFICATE OF CORRECTION

PATENT NO.       : 6,959,128 B2                                               Page 1 of 1
APPLICATION NO.  : 10/726157
DATED            : October 25, 2005
INVENTOR(S)      : Castanon et al.

It is certified that error appears in the above-identified patent and that said Letters Patent is hereby corrected as shown below:

Column 5, Line 5, delete "Combing" and insert -- Combining --.
Column 7, Line 66, after "may", insert -- be --.
Column 8, Line 45, after "may", insert -- be --.
Column 10, Line 40, after "be", delete "forwarding", and insert -- forwarded --.
Column 10, Line 65, after "combining amplifier", insert -- , --.
Column 10, Line 65, after "amplifier the", delete ",".
Column 11, Line 4, after "either", insert -- be --.
Column 11, Line 29, after "not", insert -- be --.
Column 11, Line 35, after "each", insert -- of --.
Column 11, Line 65, after "inputs", insert --(or--.
Column 13, Line 25, after "such", insert -- that --.
Column 13, Line 28, delete "coverts", and insert -- converts --.

Signed and Sealed this

Second Day of January, 2007

JON W. DUDAS
*Director of the United States Patent and Trademark Office*